Figure 1:
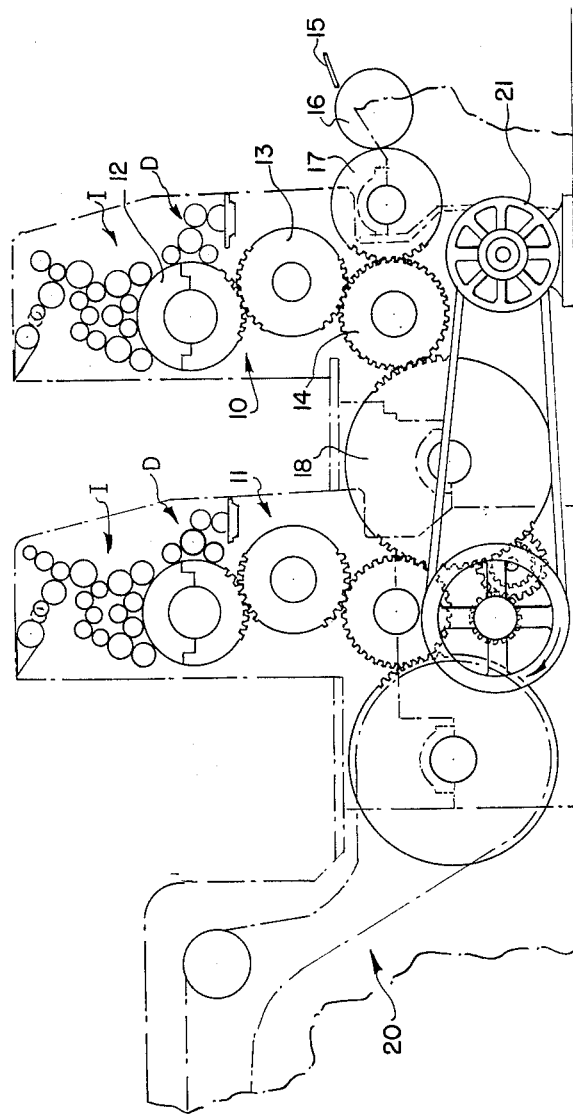

Nov. 9, 1965 W. H. LEE 3,217,222
SECONDARY CONTROL CIRCUIT FOR A WOUND ROTOR INDUCTION MOTOR
Filed Sept. 10, 1964 2 Sheets-Sheet 1

INVENTOR.
WILLIAM H. LEE
BY
*William, David,
Hoffmann & Yount*
ATTORNEYS

Nov. 9, 1965  W. H. LEE  3,217,222
SECONDARY CONTROL CIRCUIT FOR A WOUND ROTOR INDUCTION MOTOR
Filed Sept. 10, 1964  2 Sheets-Sheet 2

INVENTOR.
WILLIAM H. LEE
BY Williams, David,
Hoffmann & Fourt
ATTORNEYS

United States Patent Office 3,217,222
Patented Nov. 9, 1965

3,217,222
SECONDARY CONTROL CIRCUIT FOR A
WOUND ROTOR INDUCTION MOTOR
William H. Lee, Lakewood, Ohio, assignor to Harris-Intertype Corporation, Cleveland, Ohio, a corporation of Delaware
Filed Sept. 10, 1964, Ser. No. 395,622
24 Claims. (Cl. 318—240)

The present invention relates to printing presses and more particularly to electric motor drives therefor.

This application is a continuation-in-part of my copending application Serial No. 148,391, filed October 30, 1961, entitled "Induction Motor Speed Control."

Modern high-speed presses will print a large number of impressions while being brought up to running speed and, therefore, from an economy standpoint, it is desirable that the impressions be usable. Disturbances which occur will cause the impressions to be poor and result in much scrap material. A printing press, particularly a multicolor sheet-fed lithographic press, could also be capable of operating at different speeds so that the speed of the press can be adjusted to a desirable maximum for the particular work being printed. Problems have been encountered in providing the variable speed necessary and also in providing a drive which will smoothly take the press from a low speed to its run speed. If the drive exerts excessive torque when the drive is operated to take the press from its slow speed to its run speed or to correct the running speed, print disturbances may result. In addition, excessive torque overloads many of the drive parts of the press and is a contributing factor to breakdown.

Direct current motors have been used as the drive for printing presses to obtain variable speed. However, such drives are expensive and A.C. drives which are less expensive have not had smooth slipless control which is advantageous in minimizing print disturbances.

Accordingly, an important object of the present invention is to provide a new and improved printing press, particularly a multi-unit sheet-fed lithographic printing press, in which an alternating current electric drive is provided whose accelerating characteristics are such that the press can be started and brought up to speed in a smooth manner and without exerting excessive torque.

A further object of the present invention is to provide an alternating current motor drive for a printing press which will operate to smoothly accelerate the printing press to its printing speed and which is controlled in such a manner as to minimize the tendency to overshoot or hunt.

Yet another object of the present invention is to provide a new and improved drive for a printing press in which a wound rotor induction motor is used to drive the press and the secondary load of the wound rotor motor is automatically controlled to determine the press speed and to maintain the press at operating speed.

An additional object to the present invention is to provide a new and improved printing press drive in which the speed of a wound rotor induction motor for driving the press is controlled by a semiconductor sensing circuit which compares the voltage of the secondary of the motor with a reference voltage and effects energization of a control motor for varying the load seen by the secondary of the induction motor to control the speed thereof.

Also a further object of the present invention is to provide a new and improved printing press in which a wound rotor induction motor provides the drive for the printing press and wherein the speed of the press is controlled by a pilot motor which operates through a variable transformer to vary the impedance of the secondary of the wound rotor motor to control the speed thereof with the motor being controlled by a closed-loop system which compares a reference speed voltage with a voltage derived from the secondary of the motor and operates to provide a false difference between the two voltages while the drive motor is changing speed so as to minimize the possibility of overshooting and hunting.

Still another object of the present invention is to provide a new and improved printing press in which a wound rotor induction motor provides the drive for the press and wherein the speed of the wound rotor induction motor is controlled by comparing the secondary voltage of the wound rotor induction motor with a reference voltage by means of semiconductor devices which sense the sense of the unbalance of the voltages and operate a control motor to adjust the load of the wound rotor induction motor in a stepless manner to maintain the motor at a speed represented by the reference voltage.

A still further object of the present invention is to provide a new and improved regulator in which two voltages are compared by applying the voltages to a circuit having parallel connected branches and controlled rectifier means of the semiconductor type responsive to the voltage drop across diodes in different branches when conducting to operate a control motor in a direction corresponding to the direction of unbalance of the circuit to effect a compensation for the unbalance and to bring the voltages into balance.

It is also an object of the present invention to provide a new and improved regulator in which semiconductor means of the controlled rectifier type controls the conductivity of the secondary circuit of transformer means to effect the operation and control of the direction of operation of a control motor, the semiconductor means effecting operation of the motor in a direction dependent upon the direction of unbalance between two voltages.

In accordance with other objects, advantages and aspects of the present invention, the printing press, or other apparatus, is driven by a wound rotor motor whose speed is controlled in a smooth manner by controlling the impedance of the secondary of the wound rotor motor, the impedance of the secondary being controlled by connecting the primary of a variable transformer into the secondary circuit and by connecting the transformer secondary to a load network, the speed of the motor being controlled by effecting a change in the impedance ratio between the primary or input and the secondary or output of the variable speed transformer by operating a pilot or control motor connected to vary the transformer coupling in response to a closed loop control system in which a signal indicative of speed, preferably a voltage derived from the secondary of the drive motor, is compared with a reference signal to operate the control motor when an unbalance occurs to bring the two voltages into balance and to thereby control the speed of the wound rotor motor.

Figure 2:
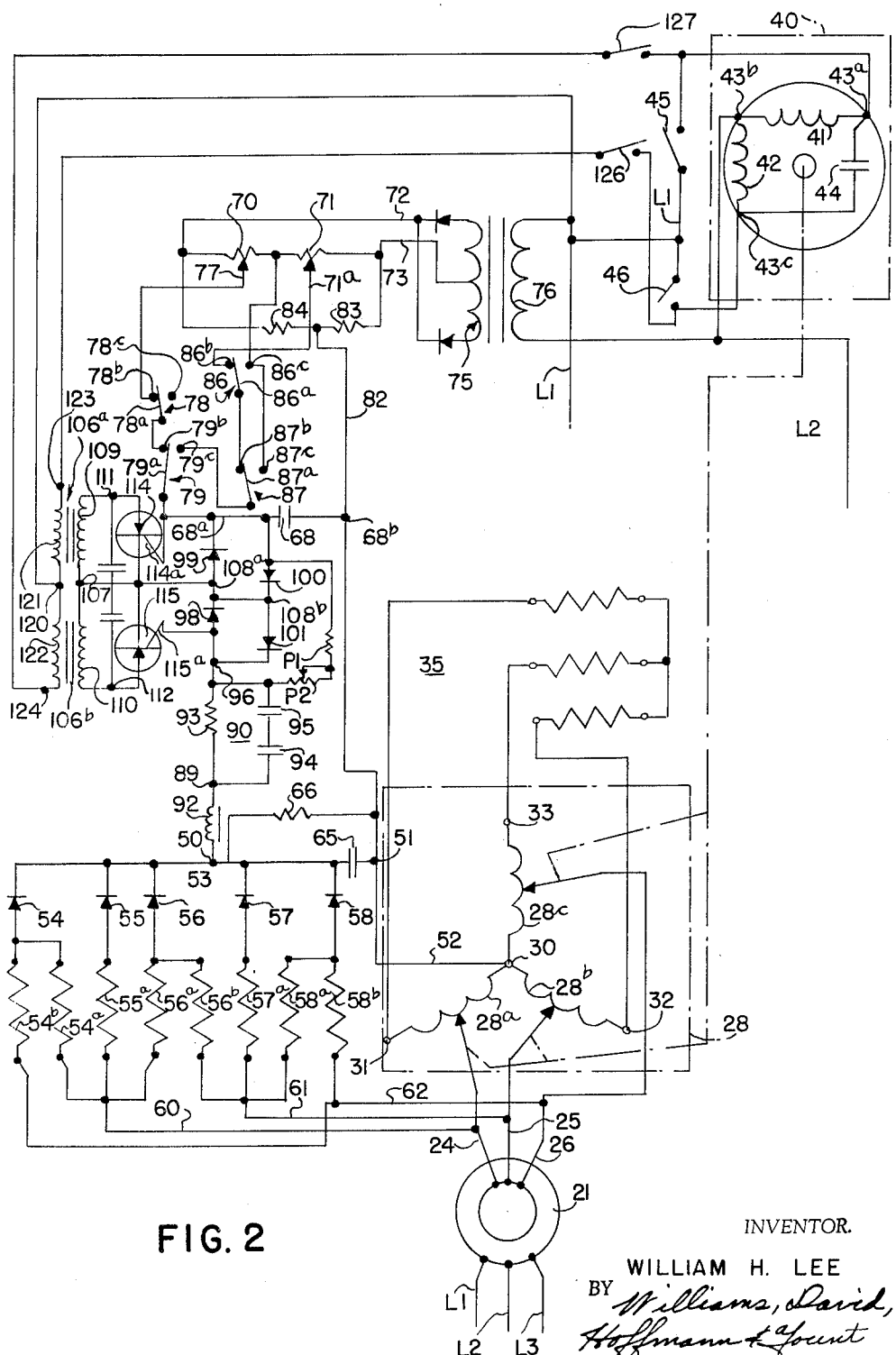

Further advantages and objects of the present invention will be apparent from the following detailed description thereof made with reference to the accompanying drawings forming a part of the present specification and in which:

FIG. 1 shows a lithographic printing press having a drive in accordance with the present invention; and FIG. 2 is a circuit diagram showing the motor for driving the press and the circuit means for controlling the motor.

Referring to FIG. 1, the present invention is shown as embodied in a lithographic sheet-fed printing press having printing units 10, 11. Each printing unit includes a plate cylinder 12, a blanket cylinder 13, and an impression cylinder 14. A conventional dampener D and a conventional inker I is associated with each plate cylinder. The sheets to be printed are fed to the first printing unit 10 from a feedboard 15 by an advance cylinder 16 and a feed cylinder 17. The sheets are transferred from the first printing unit 10 to the second printing unit 11 by a transfer cylinder 18 and are delivered from the printing unit 11 by a conventional delivery mechanism 20. The printing press is driven by a motor 21. The cylinders of the printing press are intergeared in a conventional manner by gears on the press cylinders and the drive from the motor 21 is to the transfer cylinder 18. The delivery mechanism 20 is also driven from the motor 21 by the gears on the cylinders of the press.

In accordance with the present invention, the motor 21 is an alternating current wound rotor induction motor. It has been found that such a motor has characteristics which make it uniquely adapted for use in driving printing presses, even though printing presses require a motor which is adapted to operate at various speeds. The characteristics of a wound rotor induction motor drive have proven to be such that the press can be brought up to speed in a stepless manner with a minimum of torque overload and the press maintained at the proper operating speed in an automatic manner. The use of a wound rotor motor has minimized print disturbances which normally accompany changes in press speed.

Referring to FIG. 2, the wound rotor motor 21 is shown diagrammatically as having a primary energized from a three-phase power supply, indicated by lines L1, L2, L3. The rotor of the motor 21 constitutes the secondary of the motor and has three phase windings, not shown, which are connected to secondary conductors 24, 25, 26 in a conventional manner as by slip rings and brushes. The conductors 24, 25, 26 are connected to a variable load which is adjusted in a stepless manner. In the illustrated and preferred embodiment, the conductors 24, 25, 26 are electrically connected to the input of a polyphase voltage transformer diagrammatically represented within a broken-line box 28. The polyphase voltage transformer, in the illustrated embodiment, is of the autotransformer type and has windings 28a, 28b, 28c. Each of the windings 28a, 28b, 28c has a movable slider or tap connected to a respective one of the conductors 24, 25, 26. The windings 28a, 28b, 28c are connected to a common terminal 30 and to terminals 31, 32, 33 corresponding respectively to the windings 28a, 28b, 28c and the terminals 31, 32 and 33 are connected to a load network 35 comprising three resistors connected to a common terminal at their one ends and to a respective one of the terminals 31, 32, 33 at their other ends.

The movable sliders for the windings 28a, 28b, 28c are ganged together and may be simultaneously adjusted to adjust the effective turn ratio of the transformer to vary the effective output voltage.

The variable voltage transformer 28 and the load network 35 function to control the current in the secondary of the motor 21 and thus to control the torque and speed of the motor. By effecting a change in the impedance ratio between the primary or input of the transformer and the secondary or output of the transformer, a change is effected in the electrical load apparent to the motor secondary and, thus, while the absolute impedance of the electrical load remains constant, variation or adjustment can be effected in the impedance of the load seen by the secondary of the motor, i.e., the apparent impedance of the load when viewed from the motor side of the transformer.

While the variable voltage transformer 28 can be set by hand, in the preferred and illustrated embodiment, and in accordance with one aspect of the present invention, the variable voltage transformer 28 is controlled by a control motor 40 to cause the press to run at and to maintain a preselected speed. The movable sliders of the variable voltage transformer 28 are ganged and connected to be operated by the reversible control motor 40. The control motor 40 is shown as being of a reversible split-phase type having windings 41, 42, with the direction of operation of the motor depending upon the vector relationships of the voltages in the windings 41, 42. The winding 41 is directly connected to a terminal 43a and to a terminal 43b. The winding 42 is connected directly to a motor terminal 43c and to the common terminal 43b. A condenser 44 is connected across the terminals 43a, 43c. The control motor 40 can be operated to turn in a direction to vary the variable voltage transformer in a direction to effect operation of the motor at a fast rate by closing a switch 45 to connect L1 of a single phase alternating current supply, having L2 connected to the common terminal 43b, to the terminal 43a. The motor 40 may be operated in a direction to cause the motor 21 to operate at a slower speed by closing a switch 46 which applies L1 to the terminal 43c of the motor. By operating the switches 46, 45, the pilot motor 40 can be operated to set the variable transformer to select a certain secondary load and torque for the motor 21.

The three-phase voltage of the motor secondary appearing on the conductors 24, 25, 26 is a measure of the speed at which the motor 21 is operating. In accordance with one aspect of the present invention, the secondary voltage appearing on the conductors 24, 25, 26 is compared with a reference voltage which represents a desired speed and the control motor 40 automatically operated as described hereinafter to effect operation at a speed represented by the reference voltage.

To effect control of the control motor 40, the secondary voltage 24, 25, 26 is rectified and applied across terminals 50, 51. To this end, the terminal 51 is connected to the common terminal 30 of the autotransformer 28 and the secondary conductors 24, 25, 26 are connected to the terminal 50 through a nonsymmetrical rectifying network 53 which rectifies the secondary voltage 24, 25, 26 so that a unidirectional voltage appears across the terminals 50, 51. The nonsymmetrical network 53 includes, in the illustrated embodiment, five rectifying diodes, 54, 55, 56, 57, 58 poled to conduct current flowing to the terminal 50, and the secondary conductors 24, 25, 26 are connected to the nonsymmetrical load network by respective connections 60, 61, 62. The secondary conductor 24 is connected by the connection 60 to the anodes of each of the diodes 54, 55, 56 through resistors 54a, 55a, 56a, respectively. The conductor 25 is connected to the anodes of rectifiers 56, 57, 58 by resistors 56a, 57a, 58a, respectively, and the conductor 26 is connected to the anodes of diodes 54, 58 through resistors 54b, 58b, respectively. From the foregoing, it can be seen that the voltage across the diode 54 will be determined by the phase voltages on the secondary conductors 24, 26, while the voltage applied to the diode 55 will be determined by the phase voltage on the conductor 24, the voltage across the diode 56 will be determined by the resultant of the phase voltages on the conductors 24, 25, the voltage across the diode 57 will be the phase voltage on load conductor 25, and the voltage across the diode 58 will be resultant of the phase voltages on the conductors 25, 26. As a result, the diodes 54, 55, 56, 57, 58 will conduct in a nonsymmetrical manner which improves the performance of the system for reasons discussed hereinafter. A smoothing circuit for the rectified voltage is connected to the terminal 50 and comprises a condenser 65 connected between the terminal 50 and the terminal 51 and an inductance 92 connected between the terminal 50 and a terminal 89.

The rectified secondary voltage appearing across the terminals 89, 51 is compared with a voltage established across a reference condenser 68 connected between terminals 68a, 68b. If there is a difference in the voltage appearing across the terminals 89, 51 and that across the condenser 68, a control signal is derived which causes the motor 40 to operate to set the variable transformer 28 to cause an increase or a decrease in the speed of the motor to bring the voltage across terminals 89, 51 into balance with the voltage appearing across the condenser 68.

Various reference voltages representing desired press speeds may be established across the condenser 68. A reference voltage representing the trip-slow speed of the press may be applied to the condenser 68 from a voltage dividing circuit comprising resistance potentiometers 70, 71 connected in series across the output terminals 72, 73 for a center-tapped secondary 75 of a transformer 74. The center-tapped secondary 75 is connected through rectifying diodes to the output terminals 72, 73 so as to provide full-wave rectified current to the output terminals 72, 73 when an alternating current signal is applied to the primary 76 of the transformer. The potentiometer resistance 70 is adjustable to adjust the trip-slow speed and has a slider 77 which is connected to the terminal 68a of the reference condenser 68 by a circuit including switches 78, 79 respectively having switch arms 78a, 79a, and trip contacts 78b, 79b and run contacts 78c, 79c between which the switch arms are movable. In this latter circuit, the slider 77 is connected to the trip contact 78b of the switch 78, the switch arm 78a is connected to the trip contact 79b and the switch arm 79a is connected to the terminal 68a for the condenser 68. The terminal 68b for the condenser 68 is connected to the terminal 51 and also to the terminal 73 of the transformer 74 by a connection 82 which is connected to one end of a resistor 83 having the other end connected directly to the transformer terminal 73. The connection 82 is also connected to the transformer terminal 72 by a resistor 84 so that the resistors 83, 84 provide a voltage-dividing circuit across the terminals 72, 73. Therefore, with the switches 78, 79 in their trip position, the voltage across the condenser 68 is determined by the voltage-dividing networks 77, 71 and 84, 83 and the voltage across the condenser may be adjusted by adjusting the slider 77.

A reference voltage may also be selectively applied across the condenser 68 from a slider 71a of the potentiometer resistance 71. The slider 71a is connectable to the contact 79c of the switch 79 through switches 86, 87. The contact 79c of the switch 79 is connected to the switch arm 87a of the switch 87 with the switch arm 87a having a first position, a fast position, in engagement with a contact 87b and a second position, a slow position, in engagement with a contact 87c. The contact 87b is connected to a switch arm 86a of switch 86. The switch arm 86a has a first position in engagement with a contact 86b and a second position in engagement with a contact 86c. The contact 86b is connected directly to the potentiometer slider 71a and the contact 86c is connected directly to a junction between the resistors 70, 71.

It can now be seen that the potentiometer 71 and the position of the potentiometer slider 71a control the voltage applied to the condenser 68 when the switches 86, 87 are in the position shown in the drawing and the switch 79 is moved to engage the contact 79c. Similarly, a fixed potential is applied to the condenser 68 if the switch arm 86a of the switch 86 is moved into engagement with its contact 86c, or if the switch arm 87a is moved into engagement with its contact 87a provided the switch arm 79a of the switch 79 is also moved to engage its contact 79c. Accordingly, three different circuits are provided for providing reference potentials to the condenser 68. The switches 86, 87 provide a circuit so that the voltages controlled thereby may be applied from two different locations.

The circuit for comparing the reference potential across the condenser 68 and the potential appearing across the terminals 89, 51 comprises a plurality of parallel circuits connected in series with an inductance 92 between the terminal 50 and the terminal 68a for the condenser 68. The parallel circuits include a first parallel circuit 90 connected to a terminal 89 and to a junction 96. The circuit 90 has a first branch comprising a resistor 93 connected to the junction 96 and a second branch comprising series connected condensers 94, 95 connected across the resistor 93. The junction 96 is connected to the terminal 68a for the condenser through a circuit comprising series connected diodes 98, 99 which are poled to conduct current flowing toward the condenser 68 with the anode of diode 98 being connected to the junction 96. A second circuit connects the junction 96 to the terminal 68a of the condenser and this circuit comprises series connected diodes 100, 101 poled to conduct current flowing from the condenser 68 to the terminal 96 with the diode 100 having its anode connected to the condenser 68 and the diode 101 having its cathode connected to the junction 96. Thus, it can be seen that, when an unbalance occurs in the voltages across the condensers 65, 68, current will flow either through the diodes 98, 99 or through the diodes 100, 101 depending upon the direction of unbalance.

The comparison circuit also includes transformers 106a and 106b, the transformers having respective secondary coils with one side connected to a terminal 107 connected to a junction 108a between the diodes 98, 99 and to a junction 108b between the diodes 100, 101. The secondaries of the transformers 106a, 106b have been designated by the reference numerals 109, 110 and these are connected respectively between the terminal 107 and terminals 111, 112. The terminals 111, 112 are connected to each other through back-to-back controlled rectifiers 114, 115 of the solid state type with the rectifier 114 having its anode connected to the terminal 111 and the rectifier 115 having its anode connected to the terminal 112. The cathodes of the rectifiers 114, 115 are connected to the junctions 108a, 108b and 107. The rectifiers 114, 115 also have gate electrodes 114a, 115a, respectively. The gate electrode 114a is connected to the cathode of the diode 99 so as to be at the potential of the condenser 68, while the gate electrode 115a is connected to the junction 96. If the current flow occurs through the diodes 98, 99 the voltage drop across the diode 98 will cause the gate electrode 115a to be positive with respect to the cathode of the rectifier 115 and the rectifier will conduct by reason of an avalanche type breakdown; while if the current flows through diodes 100, 101, the voltage drop across the diode 100 will be applied between the gate electrode 114a and the cathode of the rectifier 114 and the gate 114a will be positive with respect to the cathode and the rectifier will conduct. Thus, either the rectifier 115 or the rectifier 114 is rendered conductive depending upon the direction of current flow between the condensers 65, 68.

The state of the controlled rectifiers 114, 115 determines whether the control motor 40 operates, and the direction in which it operates. When neither of the control rectifiers 114, 115 is conductive, the control motor 40 is not energized to operate, but when one or the other is conductive, the motor will operate in a direction dependent upon which of the rectifiers 114, 115 is conductive.

The control of the control motor 40 is effected through the primaries of the transformers 106a, 106b. The primaries of the transformers 106a, 106b respectively comprise primary coils 121, 122 connected respectively between a common terminal 120 and terminals 123, 124. The terminal 123 is connected through switch contacts 126 to the motor terminal 43c, while the terminal 124 of the transformer 108 is connected through switch contacts 127 to the motor terminal 43a. The terminal 120 is connected to L1. When the controlled rectifiers 114, 115 are nonconductive, the secondaries of the transformers act as open secondaries and the primaries do not draw any appreciable amount of current and any current that is drawn is balanced in the motor control circuit so that there is no tendency to cause rotation of the control motor 40. If, however, one of the controlled rectifiers becomes conductive, for example, the controlled rectifier 114, the circuit is completed across the secondary coil 109 and current will be drawn in the corresponding primary coil 121. This current will flow through the primary coil 121 to the terminal 43c for the control motor and effect operation of the control motor in the direction to slow down the motor 21. Similarly, if the controlled rectifier 115 becomes conductive, current will flow in the coil 122 which is connected to the terminal 43a of the control motor 40 and the control motor will operate in the opposite direction to cause the press motor 21 to operate at a higher speed. Thus, it can now be seen that, when unbalance occurs between the voltages across the condensers 68, 65, the flow of current between the condensers will cause either the controlled rectifier 114 or the controlled rectifier 115 to be conductive to apply a voltage to the control motor 40 to cause it to operate in the direction necessary to operate the variable voltage transformer to bring the motor back to the speed represented by the reference voltage across the condenser 68.

One of the problems in making adjustments in printing presses is that the response of the system must not be too quick so as to create print disturbances but, yet, the control must be fine enough so as to prevent hunting and overshooting. The use of the wound rotor motor has solved many of the problems with respect to the sensitivity of control, and the condensers 94, 95 will operate to minimize the tendency of the system to overshoot. The condensers 94, 95 will become charged to any potential difference which exists between the condensers 65, 68. As the wound rotor motor changes speed to correct for the changes in unbalance, the condensers 94, 95 cannot quickly discharge to the difference in voltage across the circuit since the discharge circuit includes resistor 93. Therefore, the condensers will provide a voltage which will act in an additive manner to the reference voltage appearing across the condenser 68 so as to give a false indication of the difference between the potential at the terminal 50 and the potential at the terminal 68a. As adjustment is effected and the condensers 94, 95 discharge, this false difference in potential will be eliminated and the system will run at the speed represented by the potential across the reference condenser 68.

While running, the false signal introduced by the condensers 94, 95 is normally such that the control motor 40 is not driven beyond the proper torque setting to effect the necessary correction of the motor torque to compensate for changes of load, etc., which have affected the speed of the motor. However, on starting, the secondary voltage applied to the condenser 65, will be at a maximum and will normally be large as compared to the voltage on the reference condenser 68. This difference in voltage will immediately affect operation of the control motor to change the torque setting for the wound rotor induction motor, even though the control motor might be at the proper setting once the press came up to the speed represented by the voltage on the condenser 68. When this occurs, the false signal provided by the condensers 94, 95 will normally reverse the direction of current flow between the condensers 65, 68 and return the control motor to the proper speed setting before the press drive motor actually overshoots the speed represented by the voltage on the condenser 68. If found desirable under certain circumstances, the press may be started with the comparison circuit disconnected by operating the switches 125, 126 and with the control motor set at approximately the correct setting for the speed to be maintained and as the motor comes up to the speed, the sensing circuit can be rendered effective to take over the control of the motor. Alternatively, an additional false signal could be provided in the circuit on starting. Applicant has not found that either of the last two methods of operation is necessary.

During operation, the switches 79, 78, 86, 87 are operated to control the speed at which the motor is running and the potentiometer resistances 70, 71 will determine the speed selected by operation of the various switches. Printing presses normally have what is called a "trip-slow" speed. The presses on starting are first brought up to this trip-slow speed and then to the normal running speed of the press. If certain conditions are encountered during running, the presses are set up to automatically trip down to the trip-slow speed. The switch 79 is actuated to change to trip-slow speed or to change from trip-slow speed to run speed, while the switches 86, 87 determine the run speed in conjunction with the potentiometer 71.

From the foregoing, it will be noted that the reference voltage is supplied as rectified A.C. and the voltages in each of the phase windings of the motor 21 will also be an alternating current voltage which is rectified and applied to terminals 50, 51. In this type of circuit, ripple voltages will be present in the voltages which are a function of speed and of the reference voltage, respectively. When the ripple voltages are symmetrical, there is a tendency of the wound rotor motor to lock in at a speed where the ripple voltages synchronize causing the sensing circuit to lose some of its control. The unsymmetrical power rectifier 53 will, however, destroy any symmetry of the rectified voltage from the load conductors 24, 25, 26 and eliminate or minimize the tendency of the motor to lock in at a speed which synchronizes the motor with the frequency of the ripple voltage.

To adjust the sensitivity of the control system, a resistance path "P" is preferably connected in parallel with the diodes 98, 99 and diodes 100, 101 and comprises a fixed resistance P1 and a variable resistance P2.

In addition to the advantages described above, the described control system is particularly advantageous when used with motors which are connected to drive a common gear train, such as a press gear train. In such a system the control motor operates a variable coupling transformer in each secondary but the control signal for the control motor is derived from only one.

While an autotransformer has been shown as connected into the secondary of the motor 21, it will be appreciated that for certain aspects of the present invention other stepless variable impedance devices may be substituted and the transformer may be one where the primary and secondary windings are rotatable angularly with respect to each other to vary the effective turns ratio of the transformer.

While a preferred embodiment of the present invention has been described in considerable detail, it is hereby my intention to cover all modifications, constructions, and arrangements which fall within the ability of those skilled in the art and within the scope and spirit of the present invention.

Having described my invention, I claim:

1. A motor drive comprising a wound rotor induction motor having secondary phase windings which have a voltage induced therein dependent upon the speed of the motor and means for controlling the speed of the motor comprising an electrical load, adjustable transformer means having a primary connected to the secondary windings of said induction motor and a secondary connected to said electrical load for transferring energy therebetween at varying voltage ratios to thereby vary the impedance of said electrical load apparent to the secondary of said induction motor, means providing an electrical signal having a characteristic which is a function of the speed of said wound rotor induction motor, adjustable means for providing a reference electrical signal having said characteristic adjustable to indicate a desired speed of said motor, a control motor mechanically connected to said adjustable transformer means and operable in opposite directions to respectively increase and decrease the voltage ratio of said transformer means so as to vary the impedance of said load apparent to the secondary of said induction motor, and control means responsive to said signals and effecting operation of said control motor in one direction when said characteristics differ in a first direction and operating said control motor in a second direction when said characteristics differ in the opposite direction to effect correspondence of said characteristics.

2. A motor drive as defined in claim 1 wherein said control means includes circuit means providing a transient signal in response to a change in the relative magnitude of said speed and reference signals and circuit means which combines said signals to provide a resultant control signal for effecting operation of said control motor in a direction dependent upon the sense of said resultant control signal.

3. A motor drive as defined in claim 1 wherein said control means includes first and second transformers having primary coils in the circuit for energizing said control motor to respectively effect operation of said motor in a corresponding direction, said control means including circuit means for controlling the impedance in the secondaries of said transformer means as a function of the relative magnitude of said signals to effect operation of said control motor to maintain the speed indicated by said reference signal.

4. A motor drive as defined in claim 1 wherein said speed and reference signals are voltages and said control means includes respective condensers charged to provide said speed and reference voltages and means for comparing the voltages on said condensers.

5. A printing press and means for driving said printing press comprising a wound rotor induction motor having secondary phase windings which have a voltage induced therein dependent upon the speed of the motor and means for controlling the speed of the motor comprising an electrical load, adjustable induction means interconnecting the secondary windings of said induction motor and said electrical load for transferring energy therebetween at varying voltage ratios and thereby varying the impedance of said electrical load apparent to the secondary of said induction motor, means providing an electrical signal having a characteristic which is a function of the speed of said wound rotor induction motor, adjustable means for providing a reference electrical signal having said characteristic adjustable to indicate a desired speed of said motor, a control motor operatively connected to said adjustable induction means and operable in opposite directions to respectively increase and decrease the voltage ratio of said induction means so as to vary the impedance of said load apparent to the secondary of said induction motor, and control means responsive to said signals and effecting operation of said control motor in one direction when said characteristics differ in a first direction and operating said control motor in a second direction when said characteristics differ in the opposite direction to effect correspondence of said characteristics.

6. A printing press as defined in claim 5 wherein said signals are a speed voltage and a reference voltage and said control means comprises circuit means providing a control signal proportional to the difference between said speed voltage and said reference voltage and means providing a transient component tending to oppose said control signal and means responsive to the sense of said control signal and component for operating said control motor in a direction dependent upon the sense of the resultant of said control signal and transient component.

7. A printing press as defined in claim 5 wherein said control means includes means providing a control signal proportional to the difference between said speed signal and said reference signal, means responsive to a change in said control signal for providing a component signal which is combined with said signal and provides a resultant signal to reduce the control signal and means responsive to said resultant signal to effect operation of said control motor in a direction dependent upon the sense of said resultant signal.

8. A printing press and means for driving said printing press comprising a wound rotor induction motor having secondary phase windings which have a voltage induced therein dependent upon the speed of the motor and means for controlling the speed of the motor comprising an electrical load, adjustable induction means interconnecting the secondary windings of said induction motor and said electrical load for transferring energy therebetween at varying voltage ratios and thereby varying the impedance of said electrical load apparent to the secondary of said induction motor, means providing a voltage which is a function of the speed of said wound rotor induction motor, an adjustable reference voltage which is a function of the desired speed of said motor, a control motor operatively connected to said adjustable induction means and operable in opposite directions to respectively increase and decrease the voltage ratio of said induction means so as to vary the impedance of said load apparent to the secondary of said induction motor, and circuit means for sensing said speed voltage and said reference voltage and effecting operation of said control motor in one direction when the voltages are unbalanced in a first direction and operating said control motor in a second direction when the voltages are unbalanced in the opposite direction to bring the voltages into balance comprising second circuit means having pairs of input terminals to which said voltages are applied, a series connection between first one of said pairs of input terminals, said series connection comprising two parallel circuits each having two branches comprising diodes poled to conduct in opposite directions, means responsive to a voltage drop across one of said diodes poled to conduct toward one of the said first one of said input terminals when the diode is conducting to effect operation of said control motor in one direction, and means responsive to the voltage drop across one of said diodes poled to conduct in the direction toward the other one of said first ones of said input terminals when the diode is conducting to effect operation of said control motor in the opposite direction to said one direction of operation.

9. A printing press as in claim 8 wherein said means responsive to the voltage drop across said diodes comprises semiconductor devices having control and cathode electrodes connected across the respective diodes and wherein the diodes of said circuit which are different from said diodes across which said rectifier electrodes are connected provide current conducting paths to shunt the nonconductive one of the diodes across which said electrodes are connected.

10. A printing press as defined in claim 9 wherein said semiconductor devices are each connected across a respective secondary coil having a cooperating primary coil for controlling the energization of said motor for operation in a respective direction.

11. A printing press as defined in claim 8 wherein said series connection includes an additional parallel circuit comprising capacitive circuit means connected across a resistor to provide a transient component acting to minimize the differences in said voltages.

12. A motor drive comprising a wound rotor induction motor including a secondary in which voltages are induced upon energization of the motor, a load including adjustable means for adjusting the impedance of said load apparent to the secondary of said induction motor, control means for effecting said adjustment of said adjustable means comprising means providing a voltage at first output terminals which varies as a function of motor speed, means providing at second output terminals a reference voltage indicative of a desired speed, a comparison circuit interconnecting said first output terminals and said second output terminals comprising a first circuit having a diode therein poled to conduct current when one of said speed voltage and reference voltage is higher than the other and a second circuit having a second diode therein poled to conduct current when the other of said speed and reference voltages is higher, means responsive to said currents in said first and second circuits for adjusting said adjustable means in a direction to effect a balancing of said voltages.

13. A motor drive as defined in claim 12 wherein said comparison circuit includes additional circuit means responsive to a change in the relationship of said voltages to provide a transient component opposing current flow in said first and second circuits.

14. A motor drive as defined in claim 12 wherein said means responsive to said currents comprises first and second electric valve devices having electrodes including a control electrode connected across said first and second diodes respectively.

15. A motor drive as defined in claim 13 wherein said additional circuit means includes a parallel circuit in series with said first and second circuits, said parallel circuit comprising a first branch having a condenser therein and a second branch comprising a resistor.

16. A motor drive as defined in claim 15 wherein said means responsive to said currents comprises first and second electric valve devices having an electrode including a control electrode connected across said first and second diodes respectively.

17. A motor drive as defined in claim 16 wherein said means responsive to said currents comprises first and second secondary transformer coils and primary coils for inducing currents in said secondary coils and said controlled devices are connected across the respective secondary coils to conduct current in opposite directions whereby a control current flows in said primary coils dependent upon which of said valve devices is rendered conductive by current flow through said diodes.

18. A motor drive as defined in claim 17 wherein a motor is responsive to the current in said primary coils and operates in a direction dependent upon the direction of unbalance of said currents to adjust said adjustable means.

19. A motor drive comprising a wound rotor induction motor having secondary phase windings which have a voltage induced therein dependent upon the speed of the motor and means for controlling the speed of the motor comprising an electrical load, adjustable induction means interconnecting the secondary windings of said induction motor and said electrical load for transferring energy therebetween at varying voltage ratios and thereby varying the impedance of said electrical load apparent to the secondary of said induction motor, means providing a voltage which is a function of the speed of said wound rotor induction motor, an adjustable reference voltage which is a function of the desired speed of said motor, a control motor operatively connected to said adjustable induction means and operable in opposite directions to respectively increase and decrease the voltage ratio of said induction means so as to vary the impedance of said load apparent to the secondary of said induction motor, and circuit means for sensing said speed voltage and said reference voltage and effecting operation of said control motor in one direction when the voltages are unbalanced in a first direction and operating said control motor in a second direction when the voltages are unbalanced in the opposite direction to bring the voltages into balance comprising comparing means for comparing said voltages and providing a current signal having a sense dependent on the direction of unbalance of said voltages and a semiconductor device responsive to the sense of said current signal to effect operation of said control motor in a direction dependent on the sense of the current signal.

20. A motor drive as defined in claim 19 wherein said comparing means for comparing said voltages comprises means responsive to a change in said current signal providing a transient component opposing said signal.

21. A motor drive comprising a wound rotor induction motor having secondary phase windings which have a voltage induced therein dependent upon the speed of the motor and means for controlling the speed of the motor comprising an electrical load, adjustable induction means interconnecting the secondary windings of said induction motor and said electrical load for transferring energy therebetween at varying voltage ratios and thereby varying the impedance of said electrical load apparent to the secondary of said induction motor, means providing a voltage which is a function of the speed of said wound rotor induction motor, an adjustable reference voltage which is a function of the desired speed of said motor, a control motor operatively connected to said adjustable induction means and operable in opposite directions to respectively increase and decrease the voltage ratio of said induction means so as to vary the impedance of said load apparent to the secondary of said induction motor, and circuit means for sensing said speed voltage and said reference voltage and effecting operation of said control motor in one direction when the voltages are unbalanced in a first direction and operating said control motor in a second direction when the voltages are balanced in the opposite direction to bring the voltages into balance comprising first and second control circuits for energizing said motor to operate in a respective direction and each including a primary transformer coil connected in series in the circuit and having a cooperating secondary coil, and circuit means connected to said secondary coils and providing a high impedance to current flow therein and responsive to the direction of unbalance of said speed and reference voltages to provide a low impedance in circuit with a particular one of secondary coils depending on the direction of unbalance.

22. A motor drive comprising a wound rotor induction motor having secondary phase windings which have a voltage induced therein dependent upon the speed of the motor and means for controlling the speed of the motor comprising an electrical load, adjustable induction means interconnecting the secondary windings of said induction motor and said electrical load for transferring energy therebetween at varying voltage ratios and thereby varying the impedance of said electrical load apparent to the secondary of said induction motor, means providing a voltage which is a function of the speed of said wound rotor induction motor, an adjustable reference voltage which is a function of the desired speed of said motor, a control motor operatively connected to said adjustable induction means and operable in opposite directions to respectively increase and decrease the voltage ratio of said induction means so as to vary the impedance of said load apparent to the secondary of said induction motor, and sensing means for sensing said speed voltage and said reference voltage and effecting operation of said control motor in one direction when the voltages are unbalanced in a first direction and operating said control motor in a second direction when the voltages are unbalanced in the opposite direction to bring the voltages into balance; said sensing means includes means providing a control signal proportional to the difference between said speed voltage and said reference voltage, means responsive to a change in the balance of said voltages for providing a transient signal which is combined with said control signal to reduce the control signal and provide a resultant signal, and means responsive to said resultant signal to effect operation of said control motor in a direction dependent upon the sense of said resultant signal.

23. A circuit for comparing two voltages and operating a control motor in a direction dependent on the direction of unbalance of said voltages, first and second pairs of input terminals to which said voltages are respectively applied, a series connection between first one of said pairs of input terminals, said series connection comprising two parallel circuits each having two branches comprising diodes poled to conduct in opposite directions, means responsive to a voltage drop across one of said diodes poled to conduct toward one of the said first one of said input terminals when the diode is conducting to effect operation of said control motor in one direction, and means responsive to the voltage drop across one of said diodes poled to conduct in the direction toward the other one of said first ones of said input terminals when the diode is conducting to effect operation of said motor in the opposite direction to said one direction of operation.

24. A printing press and means for driving said printing press comprising a plurality of wound rotor induction motors each having secondary phase windings which have a voltage induced therein dependent upon the speed of the motor and means for controlling the speed of the motor comprising an electrical load for each motor, adjustable induction means interconnecting the secondary windings of each of said induction motors and the respective one of said electrical loads for transferring energy therebetween at varying voltage ratios and thereby varying the impedance of said electrical load apparent to the secondary of the induction motor, means providing an electrical signal having a characteristic which is a function of the speed of one of said wound rotor induction motors, adjustable means for providing a reference electrical signal having said characteristic adjustable to indicate a desired speed of said motors, a control motor operatively connected to said adjustable induction means for each motor and operable in opposite directions to respectively increase and decrease the voltage ratio of said induction means so as to vary the impedance of the load apparent to the secondaries of said induction motors, and control means responsive to said signal and effecting operation of said control motor in one direction when said characteristics differ in a first direction and operating said control motor in a second direction when said characteristics differ in the opposite direction to effect correspondence of said characteristics.

References Cited by the Examiner
UNITED STATES PATENTS

| | | | |
|---|---|---|---|
| 660,911 | 10/00 | Lamme | 318—238 |
| 731,887 | 6/03 | Girault | 310—166 |
| 2,498,871 | 2/50 | Beard | 318—207.5 |

JOHN F. COUCH, *Primary Examiner.*